US012647844B2

(12) United States Patent
Dong

(10) Patent No.: US 12,647,844 B2
(45) Date of Patent: Jun. 2, 2026

(54) WIRELESS COMMUNICATION METHOD AND APPARATUS, COMMUNICATION DEVICE, AND STORAGE MEDIUM

(71) Applicant: Beijing Xiaomi Mobile Software Co., Ltd., Beijing (CN)

(72) Inventor: Xiandong Dong, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 726 days.

(21) Appl. No.: 18/014,013

(22) PCT Filed: Jul. 3, 2020

(86) PCT No.: PCT/CN2020/100227
§ 371 (c)(1),
(2) Date: Dec. 30, 2022

(87) PCT Pub. No.: WO2022/000490
PCT Pub. Date: Jan. 6, 2022

(65) Prior Publication Data
US 2023/0308958 A1 Sep. 28, 2023

(51) Int. Cl.
*H04W 36/00* (2009.01)
*H04W 36/36* (2009.01)
*H04W 84/06* (2009.01)

(52) U.S. Cl.
CPC ..... *H04W 36/0058* (2018.08); *H04W 36/362* (2023.05); *H04W 84/06* (2013.01)

(58) Field of Classification Search
CPC ......... H04W 36/0055; H04W 36/0058; H04W 36/0061; H04W 36/0066; H04W 36/0085;
(Continued)

(56) References Cited

U.S. PATENT DOCUMENTS

| 2020/0178135 A1 | 6/2020 | Yun et al. |
| 2022/0021444 A1* | 1/2022 | Wei .................... H04B 7/06964 |
| 2022/0182893 A1* | 6/2022 | da Silva ............ H04W 36/0058 |

FOREIGN PATENT DOCUMENTS

| CN | 101827384 A | 9/2010 |
| CN | 104185233 A | 12/2014 |

(Continued)

OTHER PUBLICATIONS

Hughes Networks System Ltd. "Service continuity between terrestrial network (TN) and non-terrestrial network (NTN)", 3GPP RAN WG2 Meeting #107bis R2-1913791, Oct. 18, 2019 (Oct. 18, 2019), section 3, Type-X.

(Continued)

*Primary Examiner* — Matthew W Genack
(74) *Attorney, Agent, or Firm* — Volpe Koenig

(57) ABSTRACT

A wireless communication method, communication device, and computer readable medium that improve the communication quality of a multimode terminal and reduce power consumption. the communication quality of a multimode terminal is improved and the power consumption is reduced by, includes: receiving at least one measurement result associated with the at least one serving cell of a non-terrestrial network NTN reported by a UE; and, on the basis of the at least one measurement result associated with the at least one serving cell of the NTN, determining at least one measurement configuration for the UE to measure a terrestrial network TN.

18 Claims, 6 Drawing Sheets

(58) Field of Classification Search
    CPC ......... H04W 36/0088; H04W 36/0094; H04W
                36/34; H04W 36/36; H04W 36/362;
                H04W 36/38; H04W 36/385; H04W
                84/005; H04W 84/042; H04W 84/06
    See application file for complete search history.

(56) References Cited

FOREIGN PATENT DOCUMENTS

| | | | | |
|---|---|---|---|---|
| CN | 110536341 A | 12/2019 | | |
| CN | 111010708 A | 4/2020 | | |
| CN | 111356192 A | 6/2020 | | |
| WO | WO-2011083802 A1 * | 7/2011 | .......... | H04W 64/003 |
| WO | 2018028937 A1 | 2/2018 | | |
| WO | 2020030713 A2 | 2/2020 | | |

OTHER PUBLICATIONS

Thales et al. "NR-NTN: Preliminary solutions for NR to support non-terrestrial networks" 3GPP TSG RAN Meeting #80 RP-180664, Jun. 14, 2018 (Jun. 14, 2018), entire document, Type-A.
Huawei, HiSilicon " Service continuity between TN and NTN ", 3GPP TSG-RAN WG2 Meeting #108 R2-1915192, Nov. 8, 2019 (Nov. 8, 2019), section 2, Type-X.
Chinese Office Action issued on Apr. 1, 2023 for Chinese Patent Application No. 202080001441.7.
Chinese Office Action issued on Apr. 21, 2023 for Chinese Patent Application No. 202080001441.7.

* cited by examiner

240: report a measurement result of measuring TN, where the measurement result of measuring the TN S250: receive a handover command S260: hand over to a TN cell of the TN according to the handover command Radio communication apparatus Reporting module 210

WIRELESS COMMUNICATION METHOD AND APPARATUS, COMMUNICATION DEVICE, AND STORAGE MEDIUM

CROSS REFERENCE TO RELATED APPLICATION

The present application is a U.S. National Stage of International Application No. PCT/CN2020/100227, filed on Jul. 3, 2020, the contents of all of which are incorporated herein by reference in their entireties for all purposes.

BACKGROUND

A non-terrestrial network (NTN) is provided for user equipment (UE) by a radio access device (such as a satellite).

A cellular mobile communication network using a terrestrial base station layout is a type of terrestrial network (TN).

In order to achieve higher-quality communication services with more comprehensive coverage, there is provided a multimode terminal supporting both NTN communication and TN communication.

In the related technologies, how to integrate NTN communication and TN communication to improve the communication quality of a multimode terminal and reduce power consumption as much as possible is a technical problem to be further solved.

SUMMARY

According to a first aspect of the examples of the disclosure, a wireless communication method is provided. The method includes:

receiving at least one measurement result associated with at least one serving cell of a non-terrestrial network (NTN) reported by a user equipment (UE); and determining, according to the at least one measurement result associated with the at least one serving cell of the NTN, at least one measurement configuration for the UE to perform measurement(s) in a terrestrial network (TN).

According to a second aspect of the examples of the disclosure, a wireless communication method is provided. The method includes:

reporting at least one measurement result associated with at least one serving cell of a non-terrestrial network (NTN) of a user equipment (UE), where the at least one measurement result is configured to allow an NTN to determine at least one measurement configuration for the UE to perform measurement(s) in a terrestrial network (TN).

According to a third aspect of the examples of the disclosure, a communication device is provided. The communication device includes a processor, a transceiver, a memory, and an executable program that is stored on the memory and runnable by the processor, where when running the executable program, the processor executes the wireless communication method according to the first aspect or the second aspect.

According to a fourth aspect of the examples of the disclosure, a non-transitory computer storage medium is provided. The non-transitory computer storage medium stores an executable program; and after being executed by a processor, the executable program is capable of implementing the wireless communication method according to the first aspect or the second aspect.

BRIEF DESCRIPTION OF THE DRAWINGS

The drawings here are incorporated into the description as a constituent part of the description, illustrate examples conforming to the disclosure, and serve to explain principles of the examples of the disclosure along with the description.

DETAILED DESCRIPTION

The examples will be described in detail here and shown in the accompanying drawings illustratively. When the following descriptions relate to the drawings, unless otherwise specified, the same numeral in different drawings denotes the same or similar element. Implementations described in the following examples do not represent all implementations consistent with the examples of the disclosure. On the contrary, they are merely examples of apparatus and methods consistent with some aspects of the examples of the disclosure as described in detail in the appended claims.

The terms used in the examples of the disclosure are merely used for describing particular examples and are not intended to limit the examples of the disclosure. As used in the examples and the appended claims of the disclosure, singular forms "a" and "the" are intended to include plural forms as well, unless otherwise clearly indicated in the context. It is to be understood that the term "and/or" as used here refers to and encompasses any or all possible combinations of one or more of the associated listed items.

It is to be understood that although the terms first, second, third, etc., may be used in the examples of the disclosure to describe various information, the information is not intended to be limited to the terms. The terms are merely used to distinguish the same type of information from each other. For example, first information can also be referred to as second information, and similarly, second information can also be referred to as first information, without departing from the scope of the examples of the disclosure. Depending on the context, the word "if" and "in case," as used here, can be interpreted as "at the time of," "when," or "in response to determining."

Examples of the disclosure relate to, but are not limited to, the field of wireless communication, and particularly relate to a wireless communication method and apparatus, a communication device, and a storage medium.

In order to better describe any one of the examples of the disclosure, an application scenario of an intelligent electric meter control system is taken as an example for illustration in an example of the disclosure.

Figure 1:
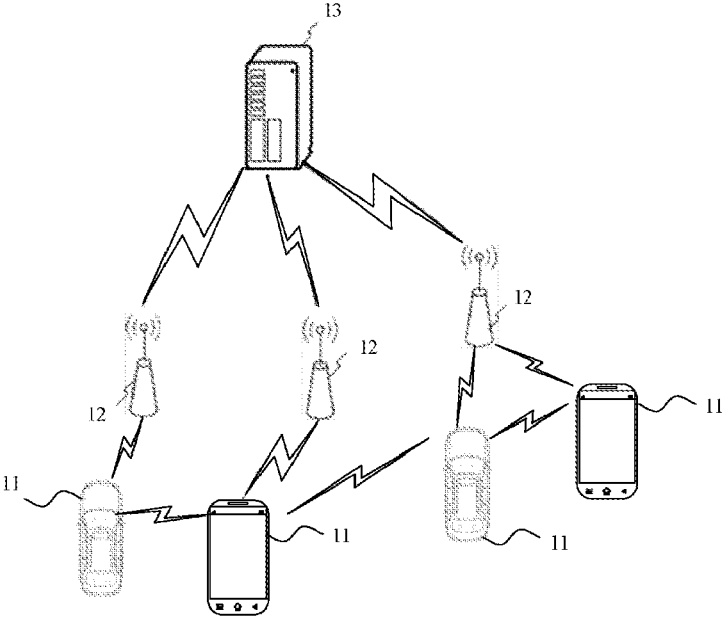
FIG. 1 is a schematic structural diagram of a wireless communication system according to an example.

FIG. 1 shows a schematic structural diagram of a wireless communication system provided by an example of the disclosure. As shown in FIG. 1, the wireless communication system is based on a cellular mobile communication technology, and the wireless communication system may include: several terminals 11 and several base stations 12.

The terminals 11 may be devices providing voice and/or data connectivity for a user. The terminals 11 may be in communication with one or more core networks via a radio access network (RAN). The terminals 11 may be Internet of Things terminals, such as sensor devices and mobile phones (or "cellular" phones), and computers having Internet of Things terminals, for example, may be stationary, portable, pocket, handheld, intra-computer, or vehicle-mounted apparatus. For example, the terminals may be a station (STA), a subscriber unit, a subscriber station, a mobile station, a mobile, a remote station, an access point, a remote terminal, an access terminal, a user terminal, a user agent, a user device, or user equipment (UE). Alternatively, the terminals 11 may also be devices of unmanned aerial vehicles. Alternatively, the terminals 11 may also be vehicle-mounted devices, such as vehicle computers having a wireless communication function, or radio terminals to which the vehicle computers are externally connected. Alternatively, the terminals 11 may also be roadside devices, such as street lamps having a wireless communication function, signal lamps, or other roadside devices.

The base stations 12 may be network side devices in a wireless communication system. The wireless communication system may be a 4th generation (4G) mobile communication system, which is also called a long term evolution (LTE) system; and alternatively, the wireless communication system may also be a 5th generation (5G) mobile communication system, which is also called a new radio (NR) system or a 5G NR system. Alternatively, the wireless communication system may also be a next-generation system of the 5G system. An access network in the 5G system may be called a new generation-radio access network (NG-RAN).

The base stations 12 may be evolved nodes B (eNBs) used in the 4G system. Alternatively, the base stations 12 may also be generation nodes B (gNBs) using central and distributed frameworks in the 5G system. When using the central and distributed framework, each base station 12 usually includes a central unit (CU) and at least two distributed units (DUs). Each central unit is provided with protocol stacks of a packet data convergence protocol (PDCP) layer, a radio link control (RLC) layer, and a media access control (MAC) layer; and each distributed unit is provided with a protocol stack of a physical (PHY) layer. Specific implementations of the base stations 12 are not limited to the examples of the disclosure.

The base stations 12 are in radio connection with the terminals 11 by means of radio air interfaces. In different implementations, the radio air interfaces are based on a 4G standard; alternatively, the radio air interfaces are based on a 5G standard, such as new radio; and alternatively, the radio air interfaces may also be based on a next-generation mobile communication network technology standard of 5G.

In some examples, an end to end (E2E) connection may be further established between the terminals 11, for example, in scenarios such as vehicle to vehicle (V2V) communication, vehicle to infrastructure (V2I) communication, and vehicle to pedestrian (V2P) communication in vehicle to everything (V2X) communication.

In some examples, the wireless communication system may further include a network management device 13.

Several base stations 12 are connected to the network management device 13 separately. The network management device 13 may be a core network device in the wireless communication system. For example, the network management device 13 may be a mobility management entity (MME) in an evolved packet core (EPC). Alternatively, the network management device may also be other core network devices, such as a serving gateway (SGW), a public data network gateway (PGW), a policy and charging rules function (PCRF), or a home subscriber server (HSS). An implementation of the network management device 13 is not limited to the examples of the disclosure.

The 5G NR introduces a non-terrestrial network (NTN). The NTN includes, but is not limited to, a 5G satellite communication network. The satellite communication network has a characteristic of a large cell radius. For a medium/low earth orbit satellite, a cell covering radius may be 100 KM-1000 KM; and for a synchronous orbit satellite, a cell covering radius may reach several kilometers. Considering the integration of the NTN and a terrestrial network (TN) as well as supplementary coverage of the TN to the NTN or of the NTN to the TN, the NTN, and the TN may be deployed in some areas, such that the NTN and the TN completely cover a certain area. Thus, when a user equipment (UE) has capabilities of both the NTN and the TN, the UE may be handed over from the NTN to the TN, to ensure service continuity. In order to hand over the UE from the NTN to the TN, the UE needs to measure a neighboring cell of the TN and report a measurement result to the NTN, such that the NTN may hand over the UE from the NTN to the TN, to ensure service continuity of the UE or make the UE obtain better services. However, considering a large radius of an NTN cell, if the NTN configures measurement of the neighboring cell of the TN when the UE enters the NTN, the power consumption of the UE may be increased, and measurement of the neighboring cell is unnecessary. Since there is no TN coverage around the UE, the TN may merely cover an edge of the NTN. In addition, if the TN is on an inconsistent frequency with the NTN, the NTN further needs to configure at least one measurement gap length for the UE, which may easily lead to a decrease in the throughput of the UE.

Figure 2:
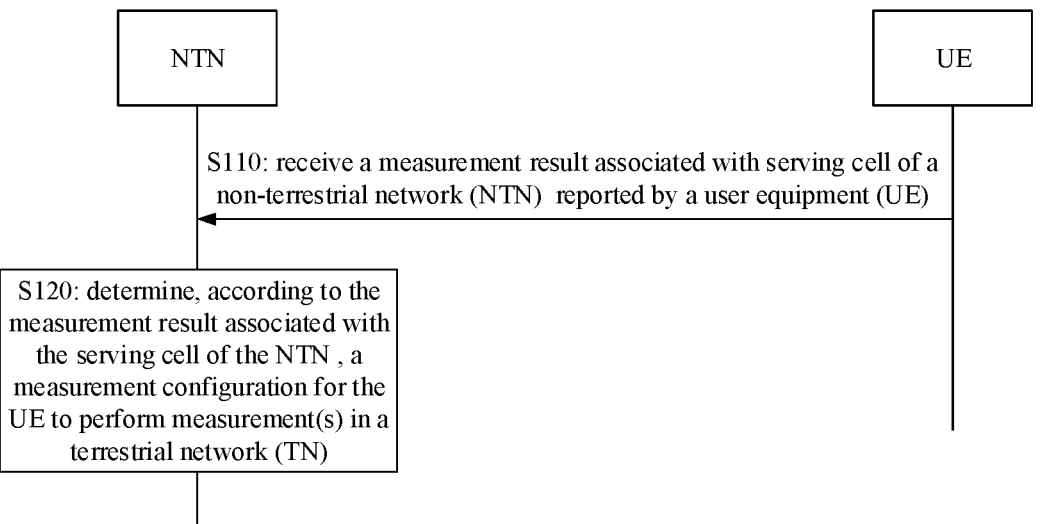
FIG. 2 is a schematic flow diagram of a wireless communication method according to an example.

As shown in FIG. 2, an example of the disclosure provides a wireless communication method. The method includes the steps that S110: at least one measurement result associated with at least one serving cell of an NTN reported by a UE is received; and S120: according to the at least one measurement result associated with the at least one serving cell of the NTN, at least one measurement configuration for the UE to perform measurement(s) in a TN is determined.

The method may be specifically used in an access device of the NTN, and the access device includes, but is not limited to, a satellite or a low-altitude aircraft. The low-altitude aircraft may be equipped with a satellite network, a WiFi network, etc.

The NTN here includes, but is not limited to, any non-terrestrial communication network. For example, the NTN may include, but is not limited to, a satellite network and/or a WiFi network built to move in the air.

The TN here includes, but is not limited to, any terrestrial communication network, such as a cellular network for cellular mobile communication or a WiFi network built by terrestrial WiFi devices.

The serving cell of the NTN may be an NTN cell belonging to the NTN, and is currently a serving cell of the UE.

When the UE stays or connects to the serving cell of the NTN, a cell signal may be measured according to at least one measurement configuration of the NTN. Under the condition that the quality of the cell signal is poor and the UE continues to connect to the serving cell of the NTN, problems of poor communication quality, such as communication interruption, may be caused. The at least one measurement result of the serving cell of the NTN may be used by the UE to be handed over the NTN cell in the NTN.

The at least one measurement result associated with the at least one serving cell of the NTN may be any measurement information for the NTN to determine whether the UE needs to be configured to perform measurement(s) in the TN and/or trigger the UE to be handed over to the TN.

For example, the at least one measurement result associated with the at least one serving cell of the NTN includes, but is not limited to, at least one of the followings:

measurement information associated with the network quality of the serving cell of the NTN, such as signal quality of the serving cell of the NTN;

and/or, mobility information of the UE in the serving cell of the NTN, which indicates a mobility speed and/or a mobility direction of the UE relative to the NTN cell.

The signal quality of the serving cell of the NTN may include at least one of the followings:

reference signal receiving quality (RSRQ) of the serving cell of the NTN;

reference signal receiving power (RSRP) of the serving cell of the NTN; or instruction information transmitted when RSRQ/RSRP of the serving cell of the NTN measured by the UE is smaller than a reporting threshold, where the instruction information is not RSRQ/RSRP itself but indicates that signal quality of the serving cell of the NTN currently measured by the UE is smaller than the reporting threshold.

In a word, the at least one measurement result may be reported to be used for the serving cell of the NTN, to determine whether the UE needs to be handed over to a cell. Cell handover may be conducted between NTN cells or between NTN cells and TN cells.

In an example, S110 may include the step where the at least one measurement result associated with the at least one serving cell of the NTN periodically reported by the UE is received;

or, at least one measurement result reported by the UE when the at least one measurement result associated with the at least one serving cell of the NTN satisfies a reporting condition is received.

The at least one measurement result of the serving cell of the NTN reported by the UE may be reported voluntarily or based on an instruction of the NTN cell.

In summary, the UE may be triggered to report the at least one measurement result of the serving cell of the NTN in a variety of ways that are not limited to any of the ways described above.

In the example of the disclosure, the at least one measurement result is further used by the NTN to determine whether to instruct the UE to perform measurement(s) in the TN at a current position of the UE. Under the condition that the UE conducts measurement and the quality of the serving cell of the NTN is poor, cell handover may be conducted between the NTN cells or between the NTN cells and the TN cells, such that handover across communication systems or communication modes is achieved, the UE may be ensured to connect to at least one cell to obtain a communication service, and providing stability of communication services is improved.

In the example of the disclosure, the NTN may transmit a measurement configuration for indicating the UE to perform measurement(s) in the TN or not, which is not based on position information reported by the UE. In this way, when staying in the NTN cell, the UE does not need to report the position information to the NTN to decide whether to perform measurement(s) in a TN, such that the cost of obtaining the position information by the UE is reduced, standby time of the UE is prolonged, and alternatively, the UE does not have the capability of obtaining the position information.

For example, the NTN receives the at least one measurement result of the serving cell of the NTN reported by the UE, and transmits a measurement configuration for indicating the UE to perform measurement(s) in the TN according to the at least one measurement result.

In an example, the method may include the step where the at least one measurement configuration for indicating the UE to perform measurement(s) in the TN is directly transmitted according to the at least one measurement result associated with the at least one serving cell of the NTN.

For example, in response to determining that the UE measures the TN according to the at least one measurement result, the at least one measurement configuration for indicating the UE to perform measurement(s) in the TN is transmitted. In addition, the method further includes the step where, in response to determining that the UE does not measure the TN according to the at least one measurement result, the at least one measurement configuration is not transmitted. In this way, an unnecessary process of transmitting signaling by the NTN and receiving signaling by the UE may be reduced, signaling overhead is saved, and the power consumption of the UE is further decreased. In the example, under the condition that the UE receives no measurement configuration for measuring the TN, the TN may not be measured, and alternatively, the TN may be measured according to a previous measurement configuration for measuring the TN.

In another example, the method may further include the step:

the at least one measurement configuration is transmitted.

The at least one measurement configuration may be a measurement configuration for indicating the UE to perform measurement(s) in the TN, and/or indicating the UE not to perform measurement(s) in the TN.

For example, in response to determining that the UE needs to perform measurement(s) in the TN, the NTN transmits the at least one measurement configuration. Otherwise, the UE may be instructed not to perform measurement(s) in the TN.

For example, in response to determining that the at least one measurement configuration for the UE to perform measurement(s) in the TN is different from a current configuration for the UE to currently measure the TN, the NTN transmits the at least one measurement configuration.

In some examples, S120 may include the step:

in response to determining that the UE satisfies a measurement condition for measurements in the TN according to the at least one measurement result associated with the at least one serving cell of the NTN, configuring the UE is to perform measurement(s) in the TN; or, configuring the UE to reduce at least one measurement gap length for the TN.

Under the condition that the UE satisfies the measurement condition for measurements in the TN, the TN needs to be measured currently. The TN is measured, such that when the UE needs to be handed over to a TN cell, the UE may know the at least one measurement result of the TN in time, a TN cell suitable for access of the UE may be selected, and a handover delay may be reduced.

The step that configuration is conducted to measure the TN includes, but is not limited to, the steps:

under the condition that the UE currently has no measurement configuration for measuring the TN, an initial measurement configuration for measuring the TN may be set for the UE; and under the condition that the UE currently has a measurement configuration for measuring the TN, a current measurement configuration for the UE to perform measurement(s) in the TN may be updated.

The step where the at least one measurement configuration for the UE to perform measurement(s) in the TN is updated may include the steps:

the at least one measurement gap length for the UE to perform measurement(s) in the TN is reduced; and/or, a threshold, for triggering the UE to perform measurement(s) in the TN, of signal quality of the serving cell of the NTN is reduced.

Under the condition that the UE does not satisfy the measurement condition for measurements in the TN, the UE may currently obtain better communication service quality in the current serving cell of the NTN without measuring the TN. In order to reduce the power consumption of the UE, the UE may not be configured to perform measurement(s) in the TN. Alternatively, a current measurement gap length for the UE to perform measurement(s) in the TN may not be changed, or even at least one measurement gap length for the TN may be increased.

For example, S220 of the method may include the step:

under the condition that the at least one measurement result indicates that the quality of the cell signal of the serving cell of the NTN measured by the UE is smaller than a first threshold, it may be determined that the UE satisfies the measurement condition for measuring the TN.

For another example, under the condition that the at least one measurement result indicates that the quality of the cell signal of the serving cell of the NTN measured by the UE is greater than or equal to a first threshold, it may be determined that the UE does not satisfy the measurement condition for measuring the TN.

Under the condition that the signal quality of the serving cell of the NTN is smaller than the first threshold, the signal quality between the serving cells of the NTNs of the current UE may be poor. Under the condition that the UE continues to stay in the serving cell of the NTN, the communication service quality may not be good or continue to be degraded, and then it is determined that the UE needs to perform measurement(s) in the TN, to determine the at least one measurement configuration for the UE to perform measurement(s) in the TN, or accelerate the at least one measurement configuration for measuring the TN. The at least one measurement configuration for measuring the TN may be accelerated by reducing a time interval between two neighboring times of measurement of the TN.

In another example, S120 may include the step:

in response to determining that the UE does not satisfy a measurement condition for measurements in the TN according to the at least one measurement result associated with the at least one serving cell of the NTN, the UE is configured not to perform measurement(s) in the TN, and alternatively, the UE is configured not to change at least one measurement gap length for the TN.

Under the condition that the UE does not satisfy the measurement condition for measurements in the TN and is not configured to measure the TN, the UE may not measure the TN.

Under the condition that the UE does not satisfy the measurement condition for measurements in the TN, and the UE currently has a measurement configuration for measuring the TN, a current measurement configuration may be continuously maintained. For example, the current measurement gap length may be maintained.

In another example, under the condition that the UE does not satisfy the measurement condition for measurements in the TN, the at least one measurement gap length for the UE to perform measurement(s) in the TN may further be prolonged.

The gap length for measuring the TN is not configured, changed or prolonged, such that unnecessary measurement is reduced, waste of power consumption of the UE is reduced, and standby time of the UE is prolonged.

It is determined that the UE satisfies the measurement condition for measuring the TN under at least one of the following conditions:

according to the at least one measurement result associated with the at least one serving cell of the NTN, an edge of the UE in the serving cell of the NTN is determined; or according to the at least one measurement result associated with the at least one serving cell of the NTN, an edge of the UE about to enter the serving cell of the NTN is determined.

An NTN cell may be divided into a cell center close to a center of the NTN cell and cell edges away from the center. In some cases, the whole area that is not the cell edges in the NTN cell may be called the cell center.

Under the condition that the UE is located at a cell edge of the serving cell of the NTN, the signal quality of the UE may be statistically lower than that of the UE located at the cell center of the serving cell of the NTN.

Information associated with the at least one serving cell of the NTN includes:

information associated with network quality of the serving cell of the NTN.

The information associated with the network quality of the serving cell of the NTN reflects a distance between the UE and an access device of the serving cell of the NTN or a center of the serving cell of the NTN.

For example, the information associated with the network quality of the serving cell of the NTN may include at least one of the followings:

RSRQ/RSRP of the serving cell of the NTN. The RSRQ/RSRP carried in the at least one measurement result is compared with a third threshold. Under the condition that the received RSRQ/RSRP is greater than the third threshold, the UE is considered to be located in the cell center of the serving cell of the NTN. Otherwise, the UE may be considered to be located at the cell edge.

For another example, the NTN transmits the third threshold, the UE conducting measurement compares the measured RSRQ/RSRP with the third threshold, and the at least one measurement result contains a comparison result obtained through comparison of the UE. In this case, the NTN may determine whether the UE is located at the cell edge or the cell center of the NTN according to the comparison result.

In an example, under the condition that the UE is located at the cell edge of the NTN cell, the UE has a greater probability of moving out of a coverage area of the serving cell of the NTN due to a change of the NTN and/or mobility of the UE. Thus, the at least one measurement configuration for the UE to perform measurement(s) in the TN is determined. Otherwise, at least one measurement configuration for not measuring the TN is determined.

In some examples, the at least one measurement result associated with the at least one serving cell of the NTN may further include:

mobility state information of the UE, where the mobility state information is represented for a mobility state of the UE in a serving cell of an NTN.

The step where, according to the at least one measurement result associated with the at least one serving cell of the NTN, reasons why the UE enters the cell edge of the serving cell of the NTN are determined, for example, includes, but are not limited to, the step where, according to the mobility state information, the reason why the UE enters the cell edge and/or the reason why the UE is about to enter the cell edge may be determined.

For example, the mobility state information includes: a mobility speed and/or a mobility direction of the UE.

For example, the UE may use inertial sensors (including, but not limited to, a speed sensor or an acceleration sensor) to measure its own mobility state to form the mobility state information, and the UE may further report the mobility state information. The mobility state information may be used by the NTN to determine a mobility speed of the UE relative to the serving cell of the NTN, or a mobility speed of the UE in the serving cell of the NTN, to determine the reason why the UE is located at an edge of the serving cell of the NTN. The reasons why the UE is located at the edge of the serving cell of the NTN include, but are not limited to, mobility of the UE, change of the serving cell of the NTN, and change of both the serving cell of the NTN and the UE.

Under the condition that the reasons why the UE is located at the edge of the serving cell of the NTN include the change of the serving cell of the NTN, in order to reduce the measurement power consumption of the UE, the UE may not be instructed to perform measurement(s) in the TN, and alternatively, the UE may be instructed to perform measurement(s) in the TN at a previous or increased time interval.

Under the condition that the UE is located in the NTN cell because of the mobility of the UE, the UE moves between coverage areas of different cells, and the UE is triggered to perform measurement(s) in the TN, or measure the TN at a decreased time interval, such that the TN cell is handed over to in a time when it is necessary to hand over to the TN.

In some examples, S220 may further include at least one of the following steps that in response to determining that the condition for measurements in the TN is satisfied according to the at least one measurement result associated with the at least one serving cell of the NTN, that is, the UE is located at an edge of the serving cell of the NTN and reasons why the UE is located at the edge of the serving cell of the NTN include the mobility of the UE, the at least one measurement configuration for the UE to perform measurement(s) in the TN is determined, where in this case, the step that the at least one measurement configuration for measurements in the TN is determined includes the steps that an initial configuration for the UE to perform measurement(s) in the TN is determined, and/or, the at least one measurement gap length for the UE to perform measurement(s) in the TN is reduced;

in response to determining that the condition for measurements in the TN is not satisfied according to the at least one measurement result associated with the at least one serving cell of the NTN, that is, the UE is located at an edge of the serving cell of the NTN and reasons why the UE is located at the edge of the serving cell of the NTN include change of the NTN, it is determined that the UE does not perform measurement(s) in the TN, a current configuration for the UE to perform measurement(s) in the TN is maintained, and alternatively, at least one measurement gap length for the TN is prolonged; and in response to determining that the UE is located at an edge of the serving cell of the NTN according to the at least one measurement result of the serving cell of the NTN and a reason why the UE is located at the edge of the serving cell of the NTN is the change of the NTN, an instruction is transmitted to maintain the at least one measurement configuration for the UE to perform measurement(s) in the TN.

In some examples, the step where, according to the at least one measurement result, the at least one measurement configuration for the UE to perform measurement(s) in the TN is determined includes the step:

in response to determining that the UE is located at a cell center of the serving cell of the NTN according to the at least one measurement result associated with the at least one serving cell of the NTN, it is determined that the UE does not perform measurement(s) in the TN, a current configuration for the UE to perform measurement(s) in the TN is maintained, and alternatively, at least one measurement gap length for the UE to perform measurement(s) in the TN is prolonged.

For example, under the condition that the UE is located in the cell center of the serving cell of the NTN, the serving cell of the NTN may provide better service quality for the UE, such that the UE may continue to stay in the serving cell of the NTN without handing over to another cell. In this case, in order to reduce further the power consumption of the UE, the TN may not be measured, the at least one measurement configuration for not measuring the TN is transmitted, and alternatively, the UE is not instructed to perform measurement(s) in the TN.

In an example, the at least one measurement configuration may include a measurement instruction. The measurement instruction occupies one or more bits to indicate whether to measure the TN.

In another example, the at least one measurement configuration contains no measurement instructions, but merely measurement parameters. The at least one measurement configuration including the measurement parameters is equivalent to indicating the UE to perform measurement(s) in the TN as a whole, and measuring the TN according to the measurement parameters. The measurement parameters here at least include: the at least one measurement gap length or reference information of the at least one measurement gap length.

The measurement parameters may further include time frequency resource parameters for measuring the TN, etc.

In some examples, the measurement parameters may further include: a threshold, for triggering measurement of the TN, of signal quality of the NTN. The smaller the threshold, the greater a probability of triggering the measurement of the TN according to the threshold.

Figures 3, 4:
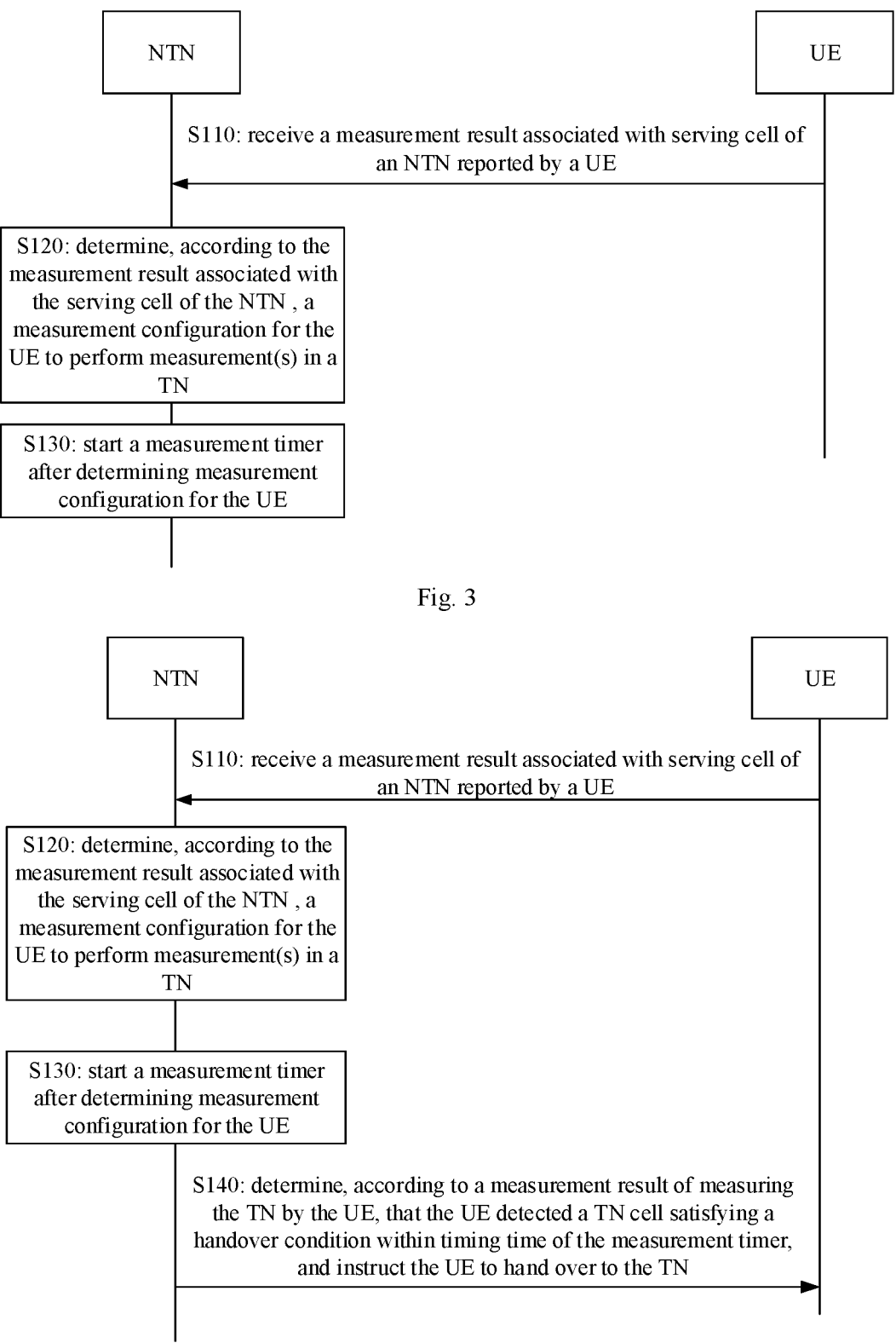
FIG. 3 is a schematic flow diagram of a wireless communication method according to an example.
FIG. 4 is a schematic flow diagram of a wireless communication method according to an example.

As shown in FIG. 3, the method further includes the step:

S130: at least one measurement timer is started after determining at least one measurement configuration for the UE.

For example, after at least one measurement configuration information of the UE is determined, a timer may be started. The at least one measurement result of measuring the TN reported by the UE is received within timing time of the measurement timer. For example, the method further includes the steps that the measurement timer is started after the at least one measurement configuration is transmitted; and the at least one measurement result of the TN is received within the timing time of the measurement timer.

In an example, the step that the at least one measurement result of the TN is received within the timing time of the measurement timer includes the step that within the timing time of the measurement timer, a detection result of a TN cell satisfying a handover condition is received, and a handover command for indicating the UE to be handed over to the TN or not is transmitted.

In another example, the method further includes the step:

in response to determining that the at least one measurement result of measuring the TN by the UE is not received when the measurement timer is timed out, and alternatively, no TN cell satisfying the handover condition is detected according to the at least one measurement result of the TN, the at least one measurement configuration is transmitted to the UE, to indicate the UE to stop performing measurement(s) in the TN or to perform measurement(s) in the TN at a longer measurement gap length.

If no TN cell satisfying the handover condition is detected within the timing time of the measurement timer, there is no TN cell in a current position. If measurement continues, the power consumption of the UE may be further increased. In order to reduce unnecessary power consumption, the UE may be instructed to stop the measurement or conduct the measurement at a longer time interval.

In another example, the method further includes the step:

in response to determining that no at least one measurement result of measuring the TN by the UE is received when the measurement timer is timed out, and alternatively, no TN cell satisfying the handover condition is detected according to the at least one measurement result of the TN, a timing of the measurement timer is increased.

Under the condition that the signal quality of the current serving cell of an NTN is poor, alternatively, the signal quality of the serving cell of the NTN and the service quality of a neighboring cell of the serving cell of the NTN are both very poor, and alternatively, the signal quality of the serving cell of the NTN is continuously decreased and there is no NTN cell suitable for access around the serving cell of the NTN, it is very necessary to detect whether there is a TN cell satisfying the handover condition around the serving cell of the NTN, and the timing of the measurement timer may be increased to increase a possibility of detecting the TN cell satisfying the handover condition by the UE.

The step where the timing duration of the measurement timer is prolonged may include at least one of the following steps:

a count value of the measurement timer is reset one or more times; or a maximum count value of the measurement timer is increased.

In this case, the condition that the signal quality of the serving cell of the NTN is very poor may include the condition that the signal quality of the current serving cell of the NTN is lower than the first threshold.

In some examples, the method further includes the step:

S140: according to at least one measurement result of the TN by the UE, it is determined that the UE detected a TN cell satisfying a handover condition within the timing time of a measurement timer, and, the UE is instructed to hand over to the TN. The step that according to at least one measurement result of the TN, whether the UE detects the TN cell satisfying the handover condition is determined may include at least one of the following steps that under the condition that according to the at least one measurement result of the TN, it is determined that at least one TN cell in the TN has signal quality reaching the second threshold, it may be determined that the UE detects the TN cell satisfying the handover condition. Otherwise, it may be considered that no TN cell satisfying the handover condition is detected; or under the condition that the TN cell satisfying the handover condition is detected, according to the at least one measurement result of the serving cell of the NTN, the handover command for indicating whether the UE is handed over to the TN is transmitted.

The step that under the condition that the TN cell satisfying the handover condition is detected, according to the at least one measurement result of the serving cell of the NTN, the handover command for indicating whether the UE is handed over to the TN is transmitted includes the step:

when the signal quality of the TN cell reaches the second threshold, and the signal quality of the serving cell of the NTN is lower than a fourth threshold, a handover command for indicating the UE to be handed over to the TN cell is transmitted.

In an example, the fourth threshold may be equal to the second threshold.

In another example, under the condition that the UE is connected with the NTN as much as possible, the fourth threshold may be smaller than the second threshold; and under the condition that the UE is connected with the TN as much as possible, the fourth threshold may be greater than the second threshold.

The fourth threshold and the second threshold may be determined according to the service demands of the UE and/or the communication capability of the UE in the two networks. For example, if the communication capability of the UE in the NTN is stronger than that in the TN, the fourth threshold may be smaller than the second threshold. Otherwise, the fourth threshold may be greater than the second threshold. Alternatively, if a service demand of the UE for the NTN is smaller than a service demand for the TN, the fourth threshold may be set to be greater than the second threshold. Otherwise, the fourth threshold may be smaller than the second threshold.

Certainly, the above examples are merely illustrative of a relationship between the fourth threshold and the second threshold, which is not limited here during specific implementation.

In some examples, the fourth threshold may be smaller than the first threshold, such that the UE may measure the TN in advance, complete the measurement before the signal quality of the NTN is further degraded to the fourth threshold, and determine whether to hand over to the TN cell, to improve continuity of communication quality of a terminal.

In some examples, the method further includes the steps that whether to transmit the handover command is determined according to the at least one measurement result of the serving cell of the NTN, the at least one measurement result of the neighboring cell of the serving cell of the NTN, and the at least one measurement result of the TN; and in response to determining that the signal quality of the serving cell of the NTN is not greater than the fourth threshold, the signal quality of the neighboring cell of the serving cell of the NTN does not satisfy the handover condition, and the at least one measurement result of the TN indicates that signal quality of at least one TN cell reaches the second threshold, the handover command is transmitted. The handover command controls the UE to be handed over to the TN cell having signal quality reaching the second threshold.

Figures 5, 6:
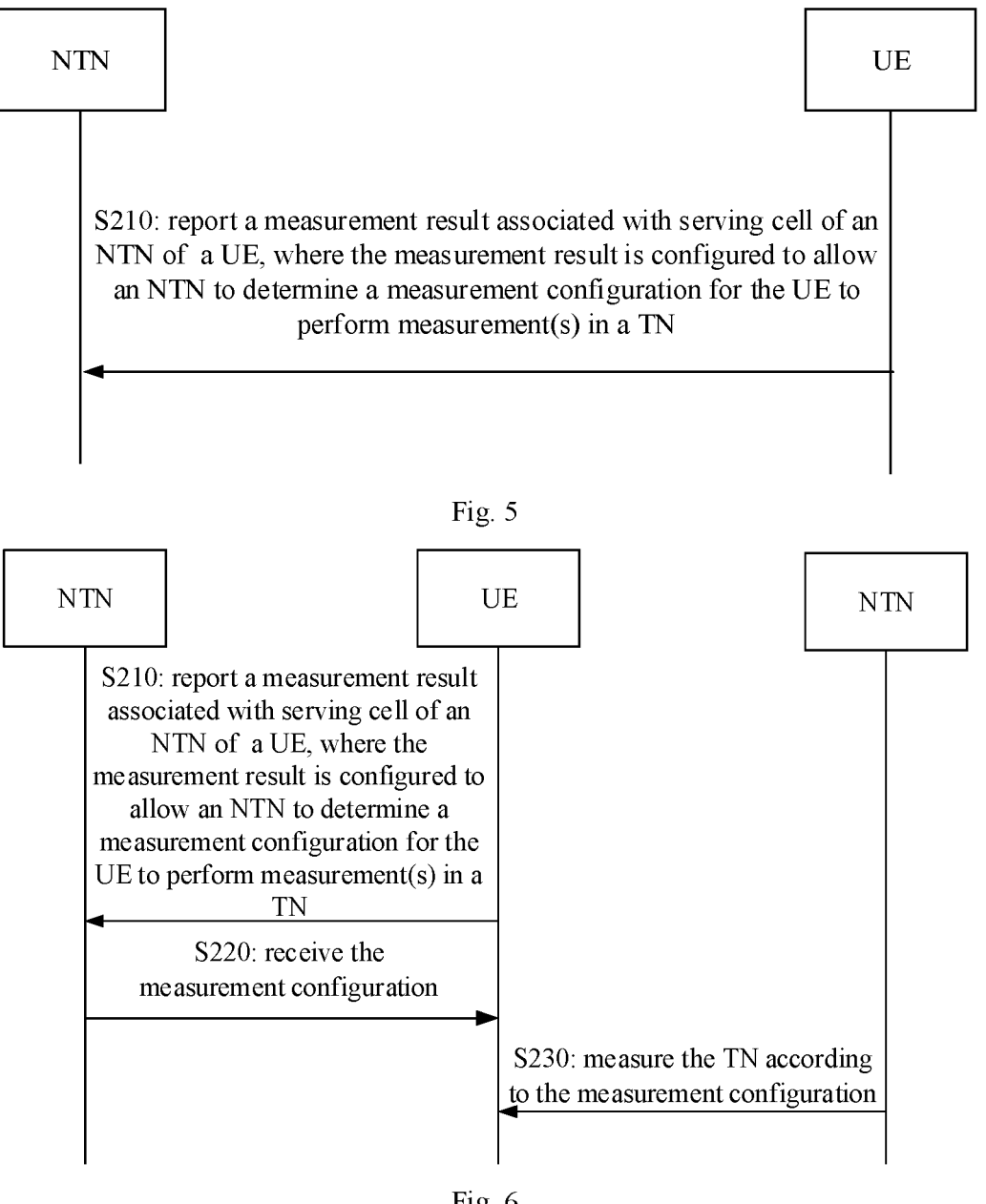
FIG. 5 is a schematic flow diagram of a wireless communication method according to an example.
FIG. 6 is a schematic flow diagram of a wireless communication method according to an example.

The condition that the signal quality of the neighboring cell of the serving cell of the NTN does not satisfy the handover condition includes the condition that the signal quality of the neighboring cell of the serving cell of the NTN does not reach the fourth threshold for handing over between the NTN cells. The fourth threshold for handing over between the NTN cells may be greater than or smaller than or equal to the second threshold. As shown in FIG. 5, an example of the disclosure provides a wireless communication method. The method includes the step that S210: at least one measurement result associated with the serving cell of an NTN of a UE is reported, where the at least one measurement result is configured to allow an NTN to determine at least one measurement configuration for the UE to perform measurement(s) in a TN.

The method may be used for multimode UE, and the multimode UE is capable of supporting both NTN communication and TN communication.

When the UE is connected with the NTN, the UE may measure the serving cell of the NTN where the UE stays or is connected in the NTN, and obtain the at least one measurement result.

The at least one measurement configuration transmitted from the NTN is received, where the at least one measurement configuration is determined according to the at least one measurement result, and is configured to indicate whether the UE measures the TN.

After the UE reports its at least one measurement results associated with the at least one serving cell of the NTN to the NTN, the NTN may determine whether the UE needs to perform measurement(s) in the TN or how to implement the at least one measurement configuration for measuring the TN according to the at least one measurement result.

The UE allows the NTN to determine whether the TN needs to be measured and what measurement parameters are used to measure the TN by directly using the at least one measurement result, for cell handover, associated with the at least one serving cell of the NTN, instead of position information obtained through the positioning of the UE, such that power consumption of the UE is reduced, standby time of the UE is prolonged, and the method is suitable for the UE without positioning capability.

In some examples, the UE may periodically report the at least one measurement result of the serving cell of the NTN, and/or report the at least one measurement result of the serving cell of the NTN when the measured cell signal quality of the serving cell of the NTN satisfies a reporting condition.

In some examples, as shown in FIG. 6, the method further includes the steps:

S220: the at least one measurement configuration is received, and

S230: the TN is measured according to the at least one measurement configuration.

The NTN may transmit the at least one measurement configuration, and the UE may receive the at least one measurement configuration for measuring the TN from the NTN, such that the UE may measure the TN according to the at least one measurement configuration.

In an example, the at least one measurement configuration may include: at least one measurement gap length for the UE to perform measurement(s) in the TN.

In another example, the at least one measurement configuration may include: a threshold for the UE to perform measurement(s) in the TN. For example, when the cell signal quality of the serving cell of the NTN is detected to be lower than the threshold, the UE is triggered to perform measurement(s) in the TN.

Certainly, the above examples are merely illustrative of the at least one measurement configuration, which is not limited here during specific implementation.

Figure 7:
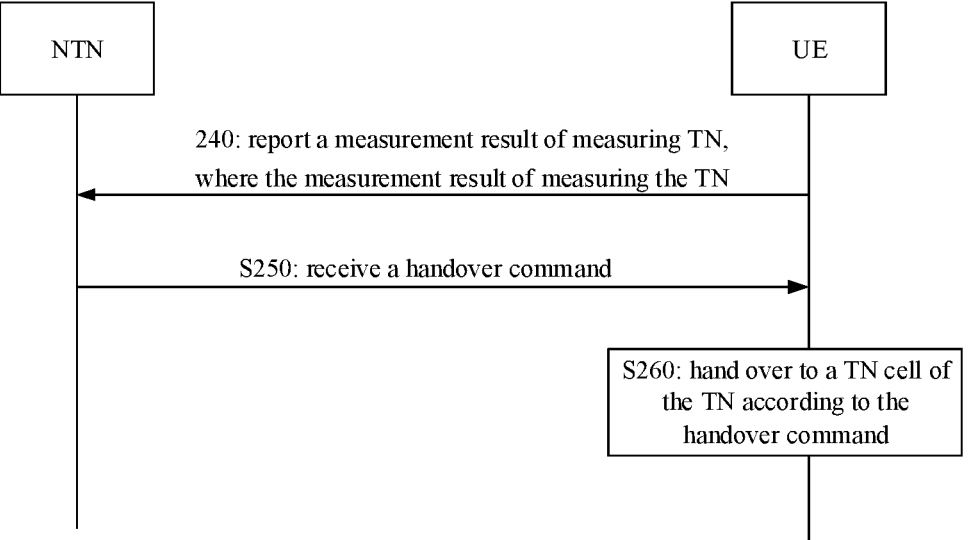
FIG. 7 is a schematic flow diagram of a wireless communication method according to an example.

In some examples, as shown in FIG. 7, the method further includes the step:

240: at least one measurement result of measuring the TN is reported, and the at least one measurement result of measuring the TN is configured to allow the NTN to determine and transmit a handover command for triggering the UE to be handed over to the TN.

Under the condition that the UE measures the TN, the at least one measurement result may be obtained. In an example, under the condition that the UE measures the TN, the at least one measurement result of TN may be reported. In another example, the UE obtains the at least one measurement result by measuring the TN, and reports the at least one measurement result when the at least one measurement result satisfies the reporting condition. For example, if the measured signal quality of the TN cell reaches a reporting threshold, at least one measurement result of the TN may be reported.

After receiving the at least one measurement result of the TN, the NTN may determine whether to instruct the UE to be handed over to the TN cell according to the at least one measurement result of the TN. If it is determined that the UE is allowed to be handed over to the TN cell, a handover command may be transmitted to the UE.

In some examples, the method further includes the steps that

S250: the handover command is received; and

S260: a TN cell of the TN is handed over according to the handover command.

Under the condition that the NTN transmits the handover command, the UE may receive the handover command and be handed over to the TN cell that satisfies the handover condition and is measured by the UE according to the handover command.

In some examples, the at least one measurement result associated with the at least one serving cell of the NTN includes at least one of the followings:

information associated with network quality of the serving cell of an NTN; or mobility state information of the UE, where the mobility state information is represented for a mobility of the UE in serving cell of an NTN.

The information associated with network quality of the serving cell of the NTN includes: the signal quality of a cell signal of the serving cell of the NTN. For example, the UE obtains RSRP/RSRQ, etc., by measuring a reference signal of any cell level of the serving cell of the NTN. The information associated with the network quality of the serving cell of the NTN may be used by the NTN to estimate a distance between the UE and a center of the serving cell of the NTN, that is, to evaluate whether the UE is located at an edge or the center of the serving cell of the NTN.

The mobility state information of the UE includes, but is not limited to, moving parameters of the UE. The moving parameters include: a mobility speed and/or a mobility direction, etc.

The mobility state information may indicate whether the reason why the UE is located at the edge of the serving cell of the NTN is mobility of the UE or the serving cell of the NTN.

The NTN determines whether the UE is located at the edge of the NTN cell according to measurements of the serving cell reported by the UE. If the UE is located at the edge of the NTN cell, the NTN is configured to measure a neighboring cell (TN). According to at least one measurement result of the UE within a certain period of time, it is determined that the UE is handed over to the TN or configured to stop measuring the TN.

The NTN configures the UE to report periodic and/or event-triggered measurements of the serving cell, and optionally, the UE may be configured to report the mobility state information, where the mobility state information of the UE may indicate the mobility speed of the UE; and according to a configuration of the NTN, the UE periodically reports the at least one measurement result to the serving cell, and/or is triggered by events to report the at least one measurement result, and reports the mobility state information according to the configuration of the network.

According to the at least one measurement result reported by the UE, the NTN determines whether the UE is located at the edge of the NTN cell. Specifically:

For a non-geostationary orbit (NGSO) satellite, the NTN may determine whether the UE is located at the cell edge of the NTN according to measurements associated with signal quality such as the RSRP/RSRQ of the serving cell reported by the UE, and furthermore, may determine whether the reason why the UE is located at the cell edge of the NTN is mobility of the UE or the network according to the mobility state information reported by the UE.

Alternatively, the UE reports no mobility state information, and the network determines whether the UE is located at the cell edge of the NTN merely according to measurements associated with signal quality such as the RSRP/RSRQ of the serving cell reported by the UE. In this case, the reason why the UE is located at the cell edge of the NTN may be the change of the network.

For a geostationary orbit (GSO) scenario, the UE does not need to report the mobility state information, and the network may determine that the UE is located at the cell edge of the NTN according to the RSRP/RSRQ reported by the UE.

When the NTN determines that the UE is located at the cell edge of the NTN, and it may be determined that the reason why the UE is located at the cell edge of the NTN is not mobility of the UE, the network does not configure the UE to conduct relevant measurement on neighboring cells of the TN, and alternatively, the network does not change the measurement configuration for the neighboring cells of the TN by the UE. Otherwise, the network configures the UE to conduct relevant measurements on the neighboring cells of the TN, and alternatively, the network configures the UE to conduct measurement on the neighboring cells of the TN in a shorter measurement period and start a timer.

According to the configuration of the NTN, the UE measures the neighboring cells of the TN, and reports the measurement. There may be no neighboring cells of the TN in the at least one measurement result reported by the UE, because the NTN may merely determine that the UE is located at the edge of an NTN, but cannot determine that UE must be located at the edge of the TN.

If there is a suitable neighboring cell of the TN in a measurement report of the UE received by the NTN before the measurement timer is timed out, the UE is configured to be handed over to the neighboring cell of the TN. If there is no suitable neighboring cell of the TN in a measurement report of the UE received by the NTN until the measurement timer is timed out, the UE is configured to stop measuring the neighboring cell of the TN or measure the neighboring cell of the TN in a longer measurement period.

Figure 8:
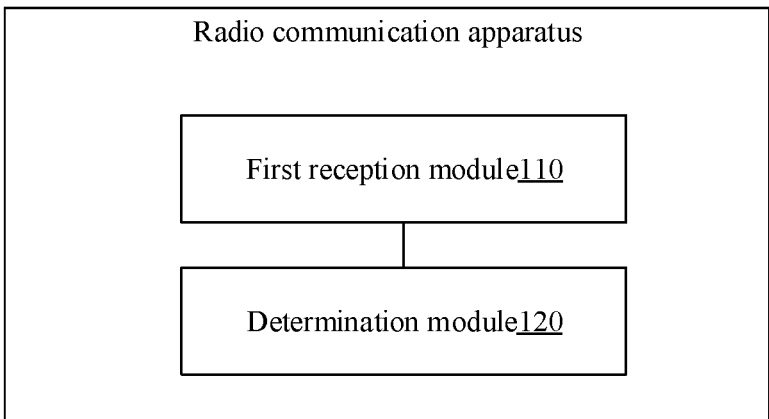
FIG. 8 is a schematic structural diagram of a wireless communication apparatus according to an example.

As shown in FIG. 8, an example of the disclosure provides a wireless communication apparatus. The apparatus includes:

a first reception module 110 configured to receive at least one measurement result associated with at least one serving cell of an NTN reported by a UE; and a determination module 120 configured to determine, according to the at least one measurement result associated with the at least one serving cell of the NTN, at least one measurement configuration for the UE to perform measurement(s) in a TN.

In some examples, both the first reception module 110 and the determination module 120 may be program modules; and after being executed by a processor, the program modules are capable of receiving the at least one measurement result and determining the at least one measurement configuration for measuring the TN.

In other examples, both the first reception module 110 and the determination module 120 may be pure hardware modules; and the pure hardware modules include, but are not limited to, application specific integrated circuits.

In still other examples, the first reception module 110 and the determination module 120 may include, but are not limited to, software-and-hardware-combined modules; and the software-and-hardware-combined modules may include, but are not limited to, various programmable arrays. The programmable arrays include, but are not limited to, field programmable gate arrays and complex programmable arrays.

In some examples, the determination module 120 is configured to configure, in response to determining that the UE satisfies a measurement condition for measurements in the TN according to the at least one measurement result associated with the at least one serving cell of the NTN, the UE to perform measurement(s) in the TN or configure the UE to reduce at least one measurement gap length for the TN.

In some examples, the determination module 120 is configured, in response to determining that the UE does not satisfy a measurement condition for perform measurement(s) in the TN according to the at least one measurement result associated with the at least one serving cell of the NTN, the UE not to perform measurement(s) in the TN or configure the UE not to change at least one measurement gap length for the TN.

In some examples, the apparatus further includes:

a starting module configured to start at least one measurement timer after determining at least one measurement configuration for the UE.

In some examples, the apparatus further includes:

a first instruction module configured to determine, according to at least one measurement result of the TN by the UE, that the UE detected a TN cell satisfying a handover condition within timing time of a measurement timer, and indicate the UE to hand over to the TN.

In some examples, the apparatus further includes:

a second instruction module configured to indicate, in response to determining that a TN cell satisfying a handover condition detected by the UE is not received when a measurement timer is timed out, the UE to stop performing measurement(s) in the TN cell or indicate the UE to increase at least one measurement gap length for the TN.

In some examples, the apparatus further includes:

an increasing module configured to increase, in response to determining that a TN cell satisfying the handover condition detected by the UE is not received when a measurement timer is timed out, a timing of the measurement timer.

In some examples, the at least one measurement result associated with the at least one serving cell of the NTN includes at least one of the followings:

information associated with network quality of serving cell of an NTN; or mobility state information of the UE, wherein the mobility state information is represented for a mobility of the UE in serving cell of an NTN.

Figure 9:
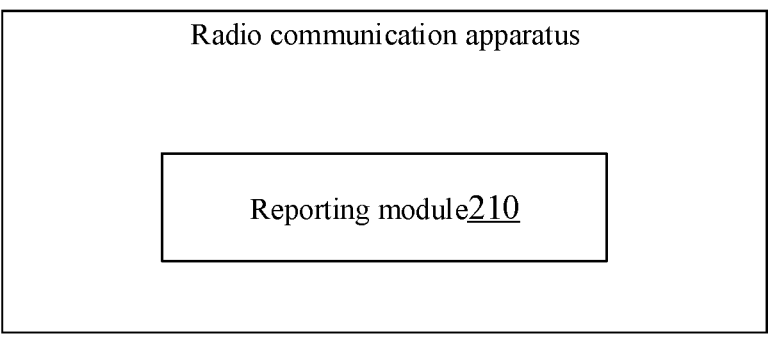
FIG. 9 is a schematic structural diagram of a wireless communication apparatus according to an example.

As shown in FIG. 9, an example of the disclosure further provides a wireless communication apparatus. The apparatus includes:

a reporting module 210 configured to report at least one measurement result associated with at least one serving cell of an NTN of a UE, where the at least one measurement result is configured to allow an NTN to determine at least one measurement configuration for the UE to perform measurement(s) in a TN.

In some examples, the reporting module 210 may be a program module; and after being executed by a processor, the program module is capable of implementing at least one measurement result of measuring the serving cell of the NTN.

In other examples, the first reporting module 210 may be a pure hardware module; and the pure hardware module includes, but is not limited to, an application specific integrated circuit.

In still other examples, the reporting module 210 includes, but is not limited to, a software-and-hardware-combined module; and the software-and-hardware-combined module may include various programmable arrays. The programmable arrays include, but are not limited to, field programmable gate arrays and complex programmable arrays.

In some examples, the apparatus further includes:

a second reception module configured to receive the at least one measurement configuration; and a measurement module configured to measure the TN according to the at least one measurement configuration.

In some examples, the at least one measurement configuration includes: at least one measurement gap length for the TN.

In some examples, the reporting module 210 is configured to report at least one measurement result of measuring the TN, and the at least one measurement result of measuring the TN is configured to allow the NTN to determine and transmit a handover command for triggering the UE to be handed over to the TN.

In some examples, the apparatus further includes:

a second reception module configured to receive the handover command; and a handover module configured to hand over to a TN cell of the TN according to the handover command.

In some examples, the at least one measurement result associated with the at least one serving cell of the NTN includes at least one of the following:

information associated with network quality of serving cell of an NTN; or mobility state information of the UE, wherein the mobility state information is represented for a mobility of the UE in serving cell of an NTN.

An example of the disclosure provides a communication device. The communication device includes a processor, a transceiver, a memory, and an executable program that is stored on the memory and runnable by the processor, where when running the executable program, the processor executes the wireless communication method that is used for UE and provided by any one of the technical solutions or executes the wireless communication method that is used for a base station and provided by any one of the technical solutions.

The communication device may be the access device or UE described above.

The processor may include various types of storage media that are non-transitory computer storage media capable of continuing to remember the information stored after the communication device is powered down. Here, the communication device includes an access device or user equipment.

The processor may be connected to the memory by means of a bus, etc., for reading the executable program stored on the memory, for example, at least one of the methods shown in FIGS. 2-7.

An example of the disclosure provides a non-transitory computer storage medium. The non-transitory computer storage medium stores an executable program; and after being executed by a processor, the executable program is capable of implementing the method shown in any one of the technical solutions of the first aspect or the second aspect, such as at least one of the methods shown in FIGS. 2-7.

Figure 10:
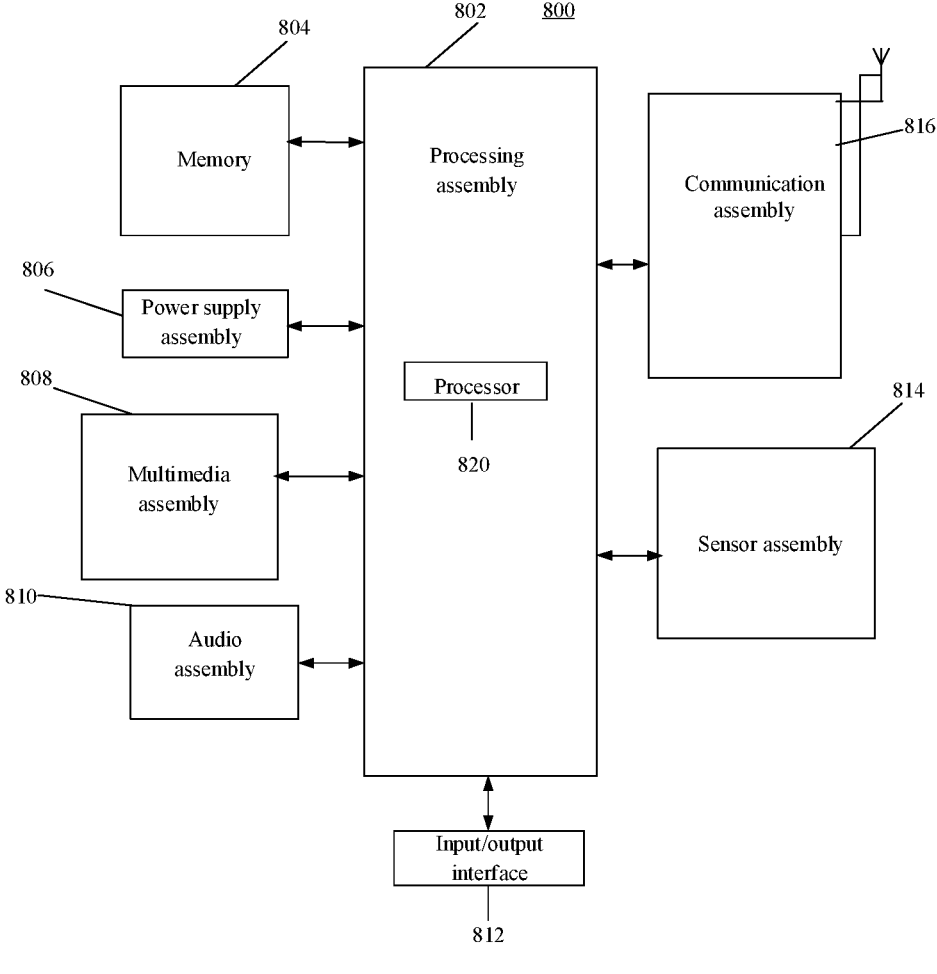
FIG. 10 is a schematic structural diagram of user equipment (UE) according to an example.

FIG. 10 is a block diagram of UE 800 according to an example. For example, the UE 800 may be a mobile phone, a computer, a digital broadcast user device, a messaging device, a gaming console, a tablet device, a medical device, a fitness device, a personal digital assistant, etc.

With reference to FIG. 10, the UE 800 may include at least one of the following assemblies: a processing assembly 802, a memory 804, a power supply assembly 806, a multimedia assembly 808, an audio assembly 810, an input/output (I/O) interface 812, a sensor assembly 814, and a communication assembly 816.

Generally, the processing assembly 802 controls all operations of the UE 800, such as operations associated with display, telephone calls, data communication, a camera operation, and a recording operation. The processing assembly 802 may include at least one processor 820 to execute instructions to complete all or some of steps of the methods described above. In addition, the processing assembly 802 may include at least one module that facilitates interaction between the processing assembly 802 and other assemblies. For example, the processing assembly 802 may include a multimedia module to facilitate interaction between the multimedia assembly 808 and the processing assembly 802.

The memory 804 is configured to store various types of data to support operations of the UE 800. Examples of the data include instructions for any application or method operated on the UE 800, contact data, phonebook data, messages, pictures, videos, etc. The memory 804 may be implemented through any type or combination of volatile or non-volatile memory devices, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, or a magnetic or optical disk.

The power supply assembly 806 provides power for various assemblies of the UE 800. The power supply assembly 806 may include a power supply management system, at least one power supply, and other assemblies associated with power generation, management, and distribution for the UE 800.

The multimedia assembly 808 includes a screen that provides an output interface between the UE 800 and a user. In some examples, the screen may include a liquid crystal display (LCD) and a touch panel (TP). In response to determining that the screen includes the touch panel, the screen may be implemented as a touch screen, to receive an input signal from the user. The touch pane includes at least one touch sensor to sense touch, swipe, and gestures on the TP. The touch sensor may sense not only a boundary of a touch or swipe, but also wake-up time and pressure associated with the touch or swipe. In some examples, the multimedia assembly 808 includes a front camera and/or a back camera. When the UE 800 is in an operation mode, such as a photographing mode or a video mode, the front camera and/or the back camera may receive external multimedia data. Each of the front camera and the back camera may be a fixed optical lens system or have a focal length and optical zoom capability.

The audio assembly 810 is configured to output and/or input an audio signal. For example, the audio assembly 810 includes a microphone (MIC) configured to receive an external audio signal when the UE 800 is in operation modes, such as a call mode, a recording mode, or a voice identification mode. The received audio signal may be further stored in the memory 804 or transmitted via the communication assembly 816. In some examples, the audio assembly 810 further includes a speaker for outputting an audio signal.

The I/O interface 812 provides an interface between the processing assembly 802 and a peripheral interface module, and the peripheral interface module may be a keyboard, a click wheel, a button, etc. The buttons may include, but are not limited to, a home button, a volume button, a start button, and a lock button.

The sensor assembly 814 includes at least one sensor for providing state assessments of various aspects for the UE 800. For example, the sensor assembly 814 may detect an on/off state of the UE 800 and the relative positioning of the assemblies. For example, the assemblies are a display and a keypad of the UE 800. The sensor assembly 814 may further detect position changes of the UE 800 or an assembly of the UE 800, presence or absence of contact between the user and the UE 800, orientation or acceleration/deceleration of the UE 800, and temperature change of the UE 800. The sensor assembly 814 may include a proximity sensor configured to detect presence of a nearby object in the absence of any physical contact. The sensor assembly 814 may further include a light sensor, such as a complementary metal oxide semiconductor (CMOS) or a charged coupled device (CCD) image sensor for imaging applications. In some examples, the sensor assembly 814 may further include an acceleration sensor, a gyroscope sensor, a magnetic sensor, a pressure sensor, or a temperature sensor.

The communication assembly 816 is configured to facilitate wired or wireless communication between the UE 800 and other devices. The UE 800 may access a radio network based on a communication standard, such as WiFi, the 2nd generation (2G) mobile communication technology or the 3rd generation (3G) mobile communication technology, or their combination. In an example, the communication assembly 816 receives a broadcast signal or broadcast related information from an external broadcast management system via a broadcast channel. In an example, the communication assembly 816 further includes a near field communication (NFC) module, to facilitate short-range communication. For example, the NFC module may be implemented based on a radio frequency identification (RFID) technology, an infrared data association (IrDA) technology, an ultra-wideband (UWB) technology, a Bluetooth (BT) technology, etc.

In an example, the UE 800 may be implemented by at least one of an application specific integrated circuit (ASIC), a digital signal processor (DSP), a digital signal processing device (DSPD), a programmable logic devices (PLD), a field programmable gate array (FPGA), a controller, a microcontroller, a microprocessor or other electronic elements for executing the methods described above.

In an example, there is further provided a non-transitory computer-readable storage medium including instructions, such as the memory 804 including instructions executable by the processor 820 of the UE 800, to complete the methods described above. For example, the non-transitory computer-readable storage medium may be ROM, a random access memory (RAM), a compact disc read-only memory (CD-ROM), a magnetic tape, a floppy disk, an optical data storage device, etc.

Figure 11:
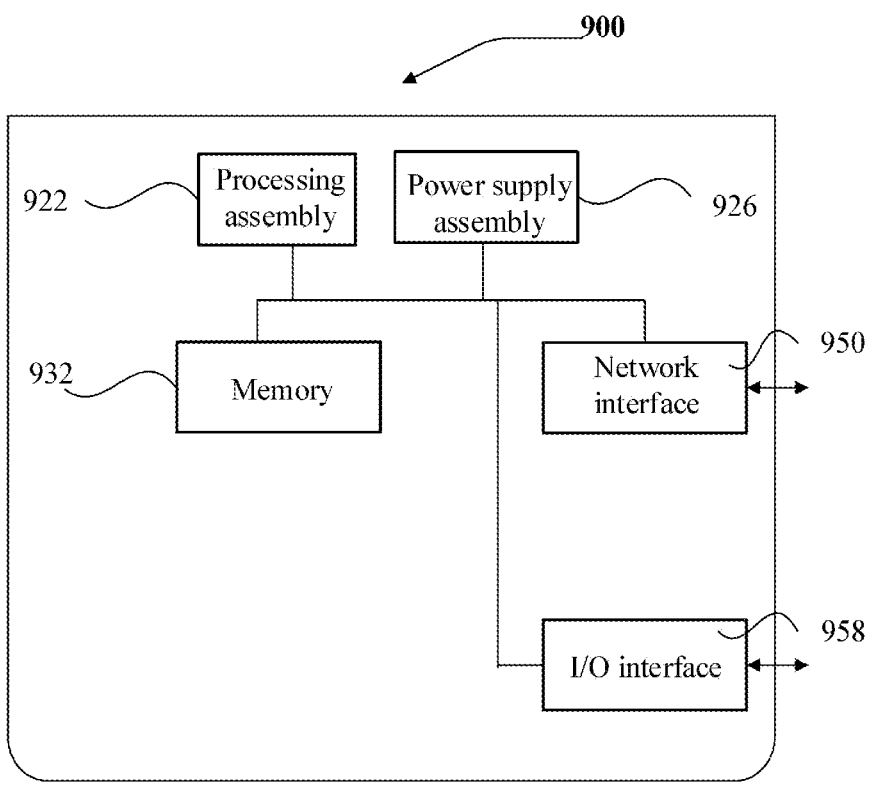
FIG. 11 is a schematic structural diagram of an access device according to an example.

As shown in FIG. 11, an example of the disclosure shows a structure of an access device. For example, the access device 900 may be provided as a network device. With reference to FIG. 11, the access device 900 includes a processing assembly 922, and further includes at least one processor, and a memory resource represented by a memory 932 for storing instructions executable by the processing assembly 922, such as applications. The applications stored in the memory 932 may include one or more modules, each of which corresponds to a set of instructions. In addition, the processing assembly 922 is configured to execute an instruction, to execute any one of the methods used for the access device, such as the methods shown in FIGS. 2-6.

The access device 900 may further include a power supply assembly 926 configured to execute power supply management of the access device 900, a wired or radio network interface 950 configured to connect the access device 900 to a network, and an V/O interface 958. The access device 900 may operate based on an operating system stored in the memory 932, such as Windows Server™, Mac OS X™, Unix™, Linux™, FreeBSD™, etc.

Those skilled in the art can readily conceive of other examples of the disclosure upon consideration of the description and practice of the disclosure. The disclosure is intended to cover any variations, uses, or adaptive changes of the disclosure, and these variations, uses, or adaptive changes follow general principles of the disclosure and include common general knowledge or customary technical means in the technical field not disclosed in the disclosure. The description and examples are considered as illustrative merely, and the true scope and spirit of the disclosure are indicated by the following claims.

It is to be understood that the disclosure is not limited to the precise structure that has been described above and shown in the accompanying drawings and can be modified and changed in various ways without departing from its scope. The scope of the disclosure is limited merely by the appended claims.

According to a first aspect of the examples of the disclosure, a wireless communication method is provided. The method includes:

receiving at least one measurement result associated with at least one serving cell of a non-terrestrial network (NTN) reported by a user equipment (UE); and determining, according to the at least one measurement result associated with the at least one serving cell of the NTN, at least one measurement configuration for the UE to perform measurement(s) in a terrestrial network (TN).

According to a second aspect of the examples of the disclosure, a wireless communication method is provided. The method includes:

reporting at least one measurement result associated with at least one serving cell of a non-terrestrial network (NTN) of a user equipment (UE), where the at least one measurement result is configured to allow an NTN to determine at least one measurement configuration for the UE to perform measurement(s) in a terrestrial network (TN).

According to a third aspect of the examples of the disclosure, a wireless communication apparatus is provided. The apparatus includes:

a first reception module configured to receive at least one measurement result associated with at least one serving cell of a non-terrestrial network (NTN) reported by a user equipment (UE); and a determination module configured to determine, according to the at least one measurement result associated with the at least one serving cell of the NTN, at least one measurement configuration for the UE to perform measurement(s) in a terrestrial network (TN).

According to a fourth aspect of the examples of the disclosure, a wireless communication apparatus is provided. The apparatus includes:

a reporting module configured to report at least one measurement result associated with at least one serving cell of a non-terrestrial network (NTN) of a user equipment (UE), where the at least one measurement result is configured to allow an NTN to determine at least one measurement configuration for the UE to perform measurement(s) in a terrestrial network (TN).

According to a fifth aspect of the examples of the disclosure, a communication device is provided. The communication device includes a processor, a transceiver, a memory, and an executable program that is stored on the memory and runnable by the processor, where when running the executable program, the processor executes the wireless communication method according to the first aspect or second aspect.

According to a sixth aspect of the examples of the disclosure, a non-transitory computer storage medium is provided. The non-transitory computer storage medium stores an executable program; and after being executed by a processor, the executable program is capable of implementing the wireless communication method according to the first aspect or second aspect. According to the technical solution provided by the examples of the disclosure, the UE does not need to report its own position information to allow the NTN to determine whether the at least one measurement configuration for the UE to measure the TN is needed, and the at least one measurement configuration for the UE to measure the TN is determined according to the at least one measurement result associated with the NTN serving cell of the UE, such that power consumption for positioning the UE is reduced, and standby time of the UE is prolonged. In addition, the method, that is based on the at least one measurement result associated with the NTN serving cell reported by the UE and requires no UE to report the position information, may also be used for UE without a positioning function, such that an application range of the UE is expanded.

What is claimed is:

1. A wireless communication method, comprising:

receiving at least one measurement result associated with at least one serving cell of a non-terrestrial network (NTN) reported by a user equipment (UE); and determining, according to the at least one measurement result associated with the at least one serving cell of the NTN, at least one measurement configuration for the UE to perform measurement(s) in a terrestrial network (TN);

wherein the at least one measurement result associated with the at least one serving cell of the NTN comprises at least one of:

information associated with network quality of the at least one serving cell of the NTN; or mobility state information of the UE, wherein the mobility state information is represented for a mobility of the UE in the at least one serving cell of the NTN, and the mobility state information comprises at least one of a mobility speed or a mobility direction of the UE;

wherein determining, according to the at least one measurement result associated with the at least one serving cell of the NTN, at least one measurement configuration for the UE to perform measurement(s) in a TN comprises:

in response to determining that the UE satisfies a measurement condition for measurements in the TN according to the at least one measurement result associated with the at least one serving cell of the NTN, configuring the UE to perform measurement(s) in the TN; or, configuring the UE to reduce at least one measurement gap length for the TN;

wherein the at least one measurement configuration comprises a measurement parameter, and the measurement parameter comprises a threshold, for triggering the UE to perform measurement in the TN, of signal quality of the at least one serving cell of the NTN;

wherein configuring the UE to perform measurement in the TN, comprises:

reducing the threshold in a case where the UE currently has a measurement configuration for measuring the TN.

2. The method according to claim 1, wherein determining, according to the at least one measurement result associated with the at least one serving cell of the NTN, at least one measurement configuration for the UE to perform measurement(s) in a TN comprises:

in response to determining that the UE does not satisfy a measurement condition for measurements in the TN according to the at least one measurement result associated with the at least one serving cell of the NTN, not configuring the UE to perform measurement(s) in the TN; or, not configuring the UE to change measurement gap length for the TN.

3. The method according to claim 1, further comprising: starting at least one measurement timer after determining at least one measurement configuration for the UE.

4. The method according to claim 3, further comprising: determining, according to at least one measurement result of the TN by the UE, that the UE detected a TN cell satisfying a handover condition within timing time of a measurement timer; and, indicating the UE to hand over to the TN.

5. The method according to claim 3, further comprising: in response to determining that a TN cell satisfying a handover condition detected by the UE is not received when a measurement timer is timed out, indicating the UE to stop performing measurement(s) in the TN cell or indicating the UE to increase at least one measurement gap length for the TN.

6. The method according to claim 3, further comprising: in response to determining that a TN cell satisfying a handover condition detected by the UE is not received when a measurement timer is timed out, increasing the timing of the measurement timer.

7. The method according to claim 1, wherein determining, according to the at least one measurement result associated with the at least one serving cell of the NTN, at least one measurement configuration for the UE to perform measurement(s) in a TN comprises at least one of:

determining, according to the at least one measurement result associated with the at least one serving cell of the NTN, that the UE is located at an edge of the serving cell of the NTN and reasons why the UE is located at the edge of the serving cell of the NTN comprise mobility of the UE, and determining at least one measurement configuration for the UE to perform measurement(s) in the TN;

determining, according to the at least one measurement result associated with the at least one serving cell of the NTN, that the UE is located at an edge of the serving cell of the NTN and reasons why the UE is located at the edge of the serving cell of the NTN comprise change of the NTN, and determining at least one measurement configuration for the UE not to perform measurement(s) in the TN; or determining, according to the at least one measurement result associated with the at least one serving cell of the NTN, that the UE is located at an edge of the serving cell of the NTN and reasons why the UE is located at the edge of the serving cell of the NTN comprise change of the NTN, and maintaining a current configuration for the UE to perform measurement(s) in the TN.

8. A wireless communication method, comprising: reporting at least one measurement result associated with at least one serving cell of a non-terrestrial network (NTN) of a user equipment (UE), wherein the at least one measurement result is configured to allow an NTN to determine at least one measurement configuration for the UE to perform measurement(s) in a terrestrial network (TN);

wherein the at least one measurement result associated with the at least one serving cell of the NTN comprises at least one of:

information associated with network quality of the at least one serving cell of the NTN; or mobility state information of the UE, wherein the mobility state information is represented for a mobility of the UE in the at least one serving cell of the NTN, and the mobility state information comprises at least one of a mobility speed or a mobility direction of the UE;

wherein the at least one measurement result is configured to determine at least one measurement configuration for the UE to perform measurement(s) in a TN by:

in response to determining that the UE satisfies a measurement condition for measurements in the TN according to the at least one measurement result associated with the at least one serving cell of the NTN, configuring the UE to perform measurement(s) in the TN; or, configuring the UE to reduce at least one measurement gap length for the TN;

wherein the at least one measurement configuration comprises a measurement parameter, and the measurement parameter comprises a threshold, for triggering the UE to perform measurement in the TN, of signal quality of the at least one serving cell of the NTN;

wherein configuring the UE to perform measurement in the TN, comprises:

reducing the threshold in a case where the UE currently has a measurement configuration for measuring the TN.

9. The method according to claim 8, further comprising: receiving the at least one measurement configuration; and measuring the TN according to the at least one measurement configuration.

10. The method according to claim 9, wherein the at least one measurement configuration comprises: at least one measurement gap length for the TN.

11. The method according to claim 9, further comprising: reporting at least one measurement result of measuring the TN to the serving cell of the NTN.

12. The method according to claim 11, further comprising at least one of:

receiving a handover command associated with a handover to the TN; or receiving an instruction associated with measuring the TN.

13. A communication device, comprising:

a transceiver;

a memory, wherein the memory stores an executable program; and a processor that is communicatively coupled to the transceiver and the memory, wherein the processor is configured to:

receive at least one measurement result associated with at least one serving cell of a non-terrestrial network (NTN) reported by a user equipment (UE); and determine, according to the at least one measurement result associated with the at least one serving cell of the NTN, at least one measurement configuration for the UE to perform measurement(s) in a terrestrial network (TN);

wherein the at least one measurement result associated with the at least one serving cell of the NTN comprises at least one of:

information associated with network quality of the at least one serving cell of the NTN; or mobility state information of the UE, wherein the mobility state information is represented for a mobility of the UE in the at least one serving cell of the NTN, and the mobility state information comprises at least one of a mobility speed or a mobility direction of the UE;

wherein the processor is further configured to:

in response to determining that the UE satisfies a measurement condition for measurements in the TN according to the at least one measurement result associated with the at least one serving cell of the NTN, configure the UE to perform measurement(s) in the TN; or, configuring the UE to reduce at least one measurement gap length for the TN;

wherein the at least one measurement configuration comprises a measurement parameter, and the measurement parameter comprises a threshold, for triggering the UE to perform measurement in the TN, of signal quality of the at least one serving cell of the NTN;

wherein the processor is further configured to reduce the threshold in a case where the UE currently has a measurement configuration for measuring the TN.

14. A non-transitory computer storage medium, storing an executable program, the executable program when executed by a processor cause the processor to execute the method according to claim 1.

15. A non-transitory computer storage medium, storing an executable program, wherein the executable program when executed by a processor cause the processor to execute the method according to claim 8.

16. The method according to claim 1, wherein determining, according to the at least one measurement result associated with the at least one serving cell of the NTN, at least one measurement configuration for the UE to perform measurement(s) in a TN comprises at least one of:

determine, according to the at least one measurement result associated with the at least one serving cell of the NTN, that the UE is located at an edge of the serving cell of the NTN and reasons why the UE is located at the edge of the serving cell of the NTN comprise mobility of the UE, and determine at least one measurement configuration for the UE to perform measurement(s) in the TN;

determine, according to the at least one measurement result associated with the at least one serving cell of the NTN, that the UE is located at an edge of the serving cell of the NTN and reasons why the UE is located at the edge of the serving cell of the NTN comprise change of the NTN, and determine at least one measurement configuration for the UE not to perform measurement(s) in the TN; or determine, according to the at least one measurement result associated with the at least one serving cell of the NTN, that the UE is located at an edge of the serving cell of the NTN and reasons why the UE is located at the edge of the serving cell of the NTN comprise change of the NTN, and maintain a current configuration for the UE to perform measurement(s) in the TN.

17. The method according to claim 1, wherein the information associated with network quality of the at least one serving cell of the NTN comprises signal quality of the at least one serving cell of the NTN, and the signal quality of the at least one serving cell of the NTN comprises at least one of:

reference signal receiving quality (RSRQ) of the at least one serving cell of the NTN;

reference signal receiving power (RSRP) of the at least one serving cell of the NTN; or instruction information transmitted when RSRQ or RSRP of the at least one serving cell of the NTN measured by the UE is smaller than a reporting threshold.

18. The method according to claim 4, wherein determining, according to at least one measurement result of the TN by the UE, that the UE detected a TN cell satisfying a handover condition, comprises:

determining that the UE detected a TN cell satisfying a handover condition, in a case where the signal quality of the TN cell reaches a second threshold, and the signal quality of the at least one serving cell of the NTN is lower than a fourth threshold.

\* \* \* \* \*